US011797709B2

(12) United States Patent
Pihur et al.

(10) Patent No.: US 11,797,709 B2
(45) Date of Patent: *Oct. 24, 2023

(54) IDENTIFYING PERSONALLY IDENTIFIABLE INFORMATION WITHIN AN UNSTRUCTURED DATA STORE

(71) Applicant: Snap Inc., Santa Monica, CA (US)

(72) Inventors: Vasyl Pihur, Santa Monica, CA (US); Subhash Sankuratripati, Playa Vista, CA (US); Dachuan Huang, Santa Monica, CA (US); Leah Fortier, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,866

(22) Filed: Jan. 25, 2022

(65) Prior Publication Data

US 2022/0147653 A1    May 12, 2022

Related U.S. Application Data

(63) Continuation of application No. 16/158,034, filed on Oct. 11, 2018, now Pat. No. 11,263,341.

(60) Provisional application No. 62/571,083, filed on Oct. 11, 2017.

(51) Int. Cl.
*G06F 21/62* (2013.01)

(52) U.S. Cl.
CPC ................. *G06F 21/6245* (2013.01)

(58) Field of Classification Search
CPC ............. G06F 21/6218; G06F 21/6227; G06F 21/6245–6254
See application file for complete search history.

(56) References Cited

U.S. PATENT DOCUMENTS

| 7,263,588 | B1* | 8/2007 | Moritz | ............... H04L 63/0428 |
| | | | | 713/193 |
| 7,895,515 | B1 | 2/2011 | Oliver et al. | |
| 11,263,341 | B1 | 3/2022 | Pihur et al. | |
| 2003/0014394 | A1* | 1/2003 | Fujiwara | ............ G06F 21/6227 |

(Continued)

OTHER PUBLICATIONS

U.S. Appl. No. 16/158,034, filed Oct. 11, 2018, Identifying Personally Identifiable Information Within an Unstructured Data Store.

(Continued)

*Primary Examiner* — Trong H Nguyen
(74) *Attorney, Agent, or Firm* — Schwegman Lundberg & Woessner, P.A.

(57) ABSTRACT

Methods and systems for identifying personally identifiable information (PII) are disclosed. In some aspects, frequency maps of fields storing known PII information are generated. The frequency maps may count occurrences of unique bigrams in the PII fields. A field of interest may then be analyzed to generate a second frequency map. Correlations between the first frequency maps and the second frequency map may be generated. If one of the correlations meets certain criterion, the disclosed embodiments may determine that the field of interest does or does not include PII. Access control for the field of interest may then be based on whether the field includes PII. In some aspects, a storage location of data included in the field of interest may be based on whether the field includes PII.

20 Claims, 9 Drawing Sheets

(56) References Cited

U.S. PATENT DOCUMENTS

| | | | |
|---|---|---|---|
| 2004/0181679 A1* | 9/2004 | Dertinger | G06F 21/6245 713/193 |
| 2009/0276240 A1* | 11/2009 | Haskell | G06Q 10/00 705/2 |
| 2012/0066214 A1* | 3/2012 | Nelke | G06F 17/10 707/723 |
| 2015/0032609 A1 | 1/2015 | Abuelsaad et al. | |
| 2016/0055261 A1 | 2/2016 | Reinhardt et al. | |
| 2017/0149793 A1* | 5/2017 | Spertus | H04L 63/105 |
| 2017/0294192 A1* | 10/2017 | Bradley | G10L 25/51 |
| 2017/0357824 A1* | 12/2017 | Barday | G06F 21/6245 |
| 2018/0004900 A1 | 1/2018 | Katsuda | |
| 2018/0268135 A1* | 9/2018 | Nachenberg | G06F 21/552 |
| 2018/0336366 A1* | 11/2018 | Scheiblauer | H04L 9/0866 |

OTHER PUBLICATIONS

"U.S. Appl. No. 16/158,034, Final Office Action dated Aug. 5, 2021", 17 pgs.

"U.S. Appl. No. 16/158,034, Non Final Office Action dated Feb. 19, 2021", 11 pgs.

"U.S. Appl. No. 16/158,034, Notice of Allowance dated Oct. 25, 2021".

"U.S. Appl. No. 16/158,034, Response filed Apr. 29, 2021 to Non Final Office Action dated Feb. 19, 2021", 10 pgs.

"U.S. Appl. No. 16/158,034, Response filed Oct. 4, 2021 to Final Office Action dated Aug. 5, 2021", 10 pages.

* cited by examiner

IDENTIFYING PERSONALLY IDENTIFIABLE INFORMATION WITHIN AN UNSTRUCTURED DATA STORE

CROSS REFERENCE TO RELATED APPLICATIONS

This application is a continuation of U.S. patent application Ser. No. 16/158,034, filed on Oct. 11, 2018, which claims the benefit of priority to U.S. Provisional Application Ser. No. 62/571,083, filed on Oct. 11, 2017. The contents of these prior applications are considered part of this application, and are hereby incorporated by reference in their entireties

TECHNICAL FIELD

The present disclosure generally relates to the technical field of personally identifiable information. In particular, methods, systems, and devices for identifying personally identifiable information within an unstructured data store are disclosed.

BACKGROUND

Personally identifiable information (PII) is information that can be used either individually or in combination with other information, to identify, contact, or locate a single person. Personally identifiable information may also be used to identify an individual in context. Any information that may be used to distinguish one person from another and can be used to deanonymize anonymous data may also be considered PII in some environments. Efforts are increasing to safeguard personally identifiable information. For example, the European Parliament enacted the General Data Protection Regulation (GDPR) to strengthen and unify data protection for individuals within the European Union. As such, there is a need to ensure that personally identifiable information is properly protected.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 8 is a block diagram of a software architecture that may be utilized by one or more of the disclosed embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, protection of personally identifiable information (PII) is of utmost importance when implementing computing systems. Several governments are passing regulations requiring that this information be protected. A technical challenge associated with protecting PII is distinguishing between stored data that is PII, and thus, needs to be appropriately protected, and other data that is not PII. This problem has become more acute with the increasing use of unstructured data storage solutions when implementing enterprise grade computing systems.

The disclosed embodiments solve this technical problem by developing signatures of PII data stored in some data structures. When additional fields storing data of an unknown character are identified, the disclosed embodiments compare a signature of the additional field with the signatures of the fields known to store PII data. If a correlation between the signatures is sufficient, the disclosed embodiments conclude that the additional field includes PII data. Some of the disclosed embodiments may provide access control to PII data differently than non-PII data. For example, in some embodiments, administrative privileges may be necessary to access PII data, whereas non-PII data may be accessed via user level privileges. In some aspects, PII data may not be displayable or printable unless a user's privilege level meets one or more criterion. In some aspects, storage locations for PII data may differ from storage locations from non-PII data. For example, some jurisdictions may require that PII data be stored within a national boundary. Thus, the disclosed embodiments may mark particular storage devices as being located in particular geographic locations. When PII data is identified, a storage location for the PII data may be identified based on a variety of factors, such as an address of a user from which the PII data is derived. The PII data may then only be stored on non-volatile storage devices physically located in a location appropriate for the user's address.

Figure 1:
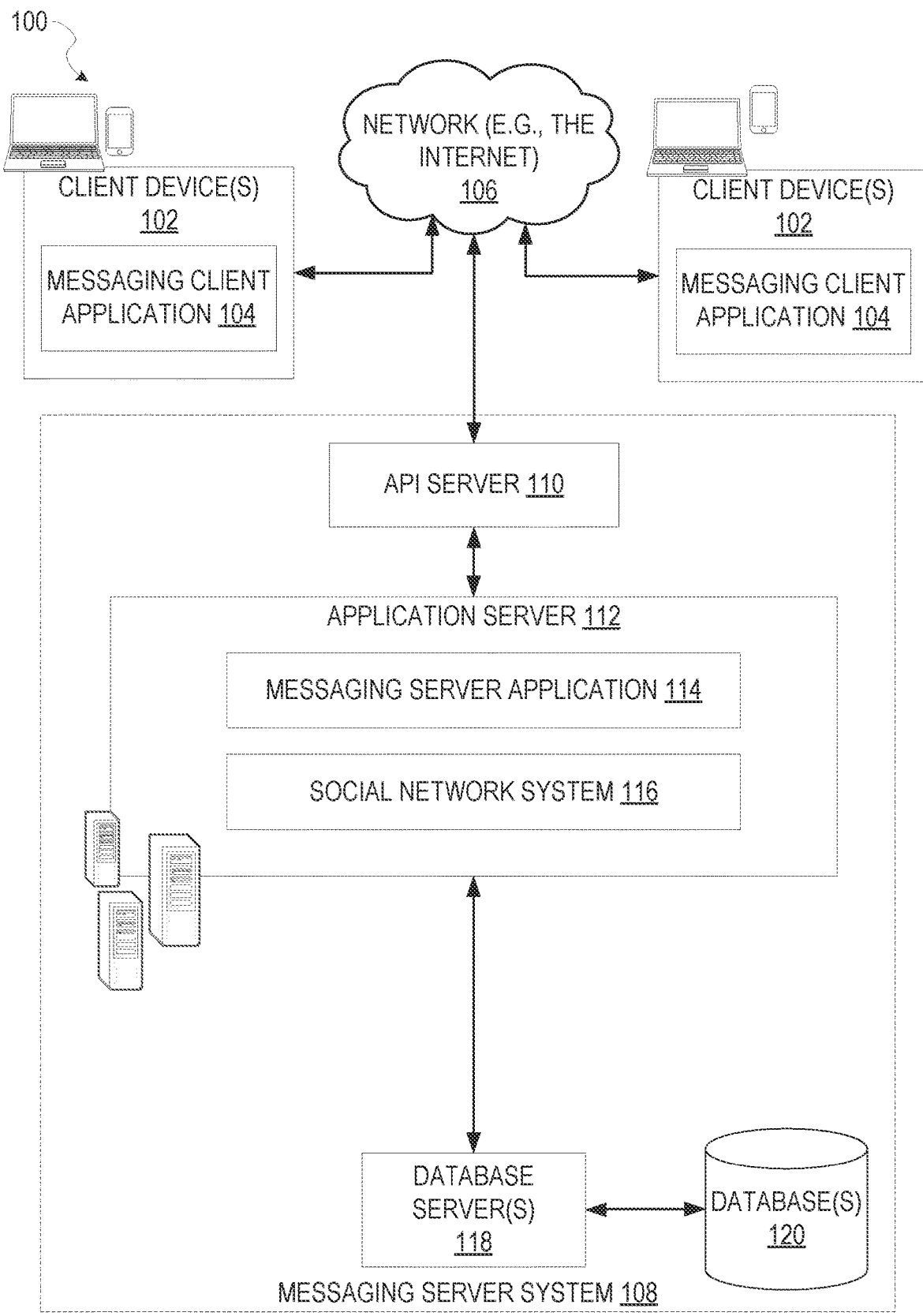
FIG. 1 is an overview diagram of a messaging system.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data. (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xITT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

The disclosed methods and systems identify personally identifiable information maintained or generated by the messaging system 100. For example, in some aspects, a signature of known personally identifiable information may be obtained. In some aspects, the known personally identifiable information may be analyzed to understand one or more statistical characteristics of the personally identifiable information. Other unknown fields may then be scanned to determine their statistical characteristics. The determined statistical characteristics may then be compared to the statistical characteristics of known fields. If the statistical characteristics of unknown fields are similar to those of particular known fields, the unknown fields may be determined to contain content of the same type as the particular known fields.

Figure 2:
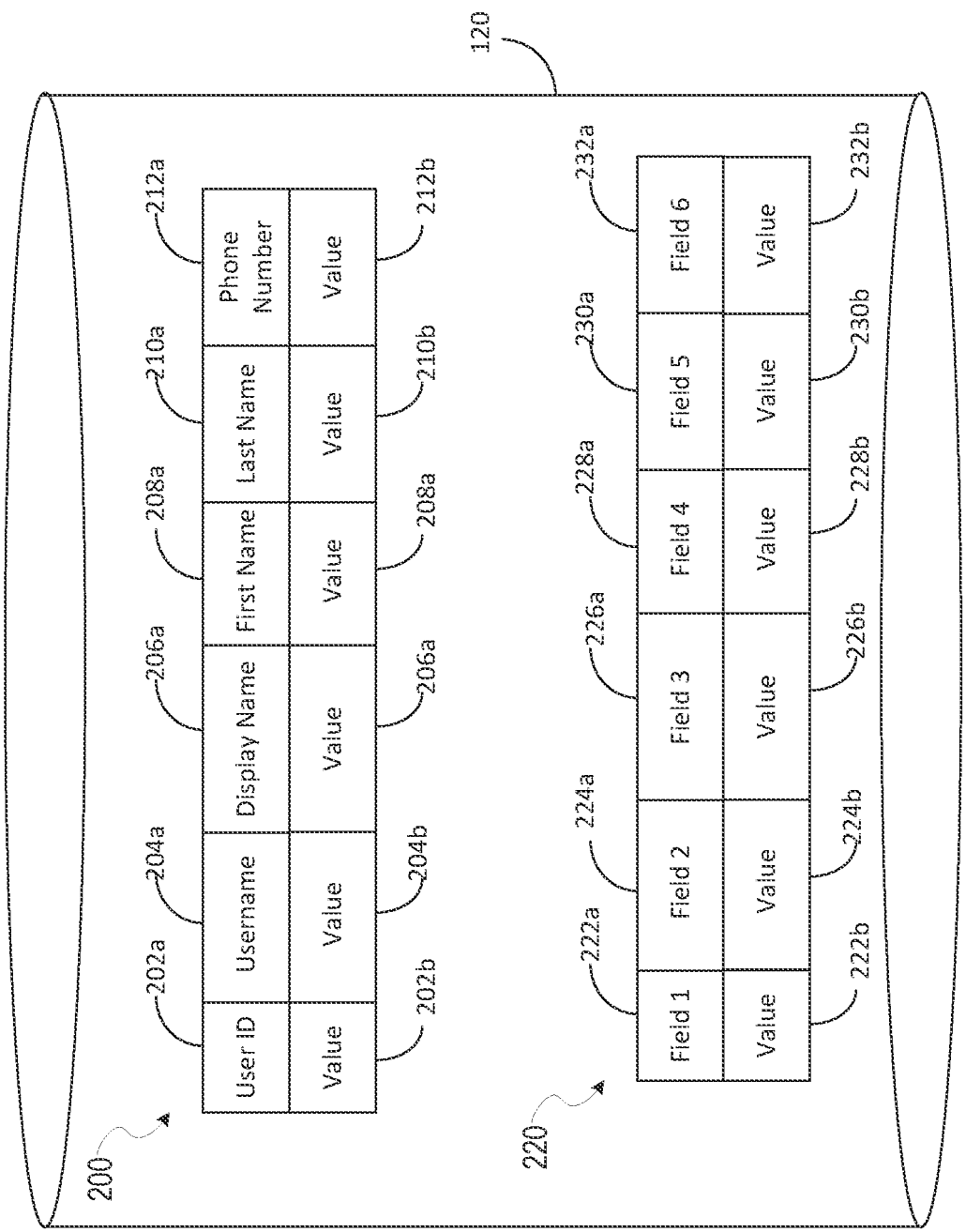
FIG. 2 shows an example of a user table.

FIG. 2 shows an example of a user table. The table 200 includes a plurality of named fields. The user table includes a field 202a naming a user id field 202b, a field 204a naming a username field 204b, a field 206a naming a display name field 206b, a field 208a naming a first name field 208b, a field 210a naming a last name field 210b, and a field 212a naming a phone number field 212b. In some aspects, the user table 200 may be implemented as an unstructured data store.

As a software system evolves over time, it may be challenging to determine whether a particular field stored in a data store (e.g. 120) contains personally identifiable information, such as a username. In some cases, the field name itself may be helpful in the determination. For example, if a field has a name of "username," there is some probability that the field includes a username and thus includes personally identifiable information. In some other aspects, a field name may not provide any indication of the type of information included in the field. For example, a fieldname such as "sender" or "receiver" may include a username, but the name of the field itself does not provide an indication that the "sender" or "receiver" as specified via user name.

Some of the disclosed embodiments may have predefined indications that one or more of the username field 204b, display name 206b, first name field 208b, last name field 210b, and phone number field 212b include personally identifiable information. These embodiments may not have any preexisting indications of whether any of the fields 222b, 224b, 226b, 228b, 230b, or 232b include PII. Additionally, the name field 222a, 224a, 226a, 228a, 230a, and 232a may also provide no indication of the type of data stored in the field 222b, 224b, 226b, 228b, 230b, and 232b respectively.

In some embodiments, the table 200 may be generated as part of a first software development effort, and the table 220 may be generated as part of a second software development effort. In some aspects, the table 220 may be generated dynamically during run time of a system. The disclosed embodiments provide methods for determining a probability of whether any one or more of the fields 222b, 224b, 226b, 228b, 230b, or 232b include PII.

Figure 3:
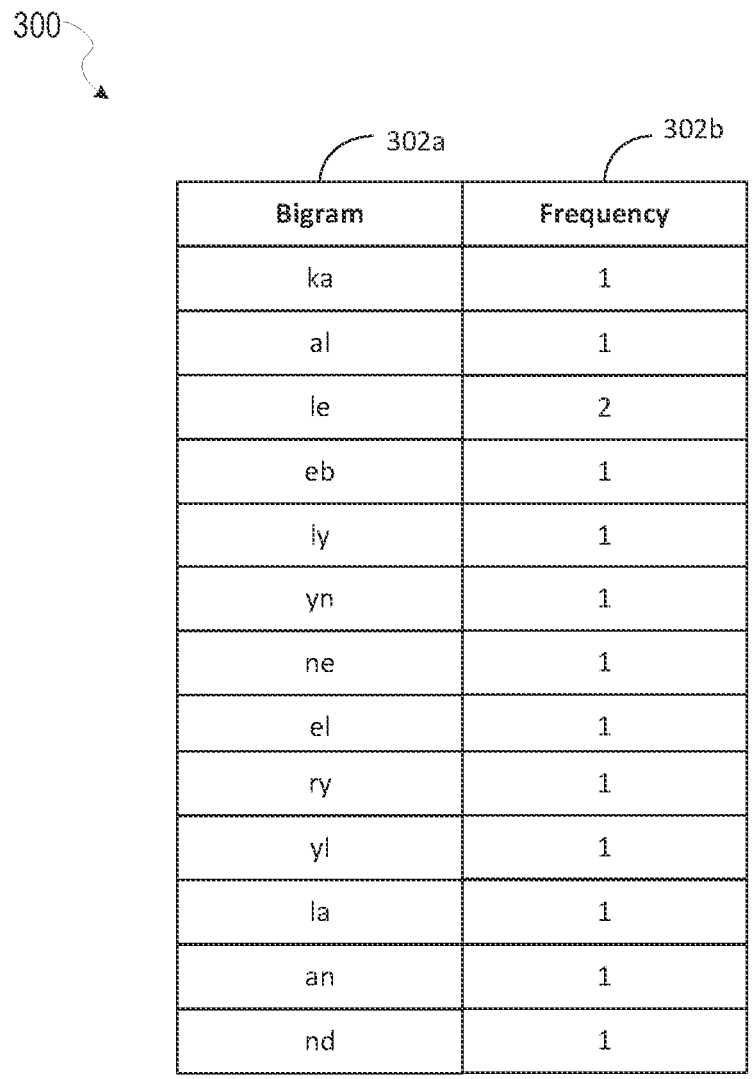
FIG. 3 is an example frequency map for a user name field.

FIG. 3 shows an example frequency map generated by at least some of the disclosed embodiments. The disclosed embodiments may generate signatures of data known to be PII. Thus, for example, an implementation may have a predefined indication that the user name field 204b contains PII Some of the disclosed embodiments may then sample a number of user name fields 204b and generate a frequency distribution of bigrams within the field. A bigram is a two character sequence taken from a sampled field. Thus, for example, the username Kaleb includes the bigrams "ka", "al", "le", and "eb". A second user name "Lynelle" includes the bigrams "ly", "yn", "ne", "el", "ll", and "le". The username "Ryland" includes the bigrams "ry" "yl", "la", "an", and "nd". An aggregation of the unique bigrams in these three example names is shown in column 302a of FIG. 3. A count of a number of occurrences of each bigram within the sampled username fields may then be created. The counts are shown in column 302b. While the example bigram frequency distribution 300 shown in FIG. 3 shows relatively low counts, one of skill will appreciate that when the frequency count is generated for thousands of field samples, the number of bigrams and the distribution of counts of each bigram will become more characteristic of data typically stored as user names. Thus, these frequencies may be compared to frequency distributions created from fields of interest, of which the content is presently unknown. In some aspects, the frequency tables may be based on large numbers of records, for example, 1,000,000 records may be used to build the frequency tables in some aspects.

This approach can of course be utilized for other types of fields as well. To determine whether a particular field contains a particular type of personally identifiable information (e.g. usernames), a Pearson correlation coefficient may be determined between normalized bigram frequencies of the two sources (known data and unknown data). Hypothesis testing and confidence intervals may be carried out via a Fisher transformation.

Figure 4:
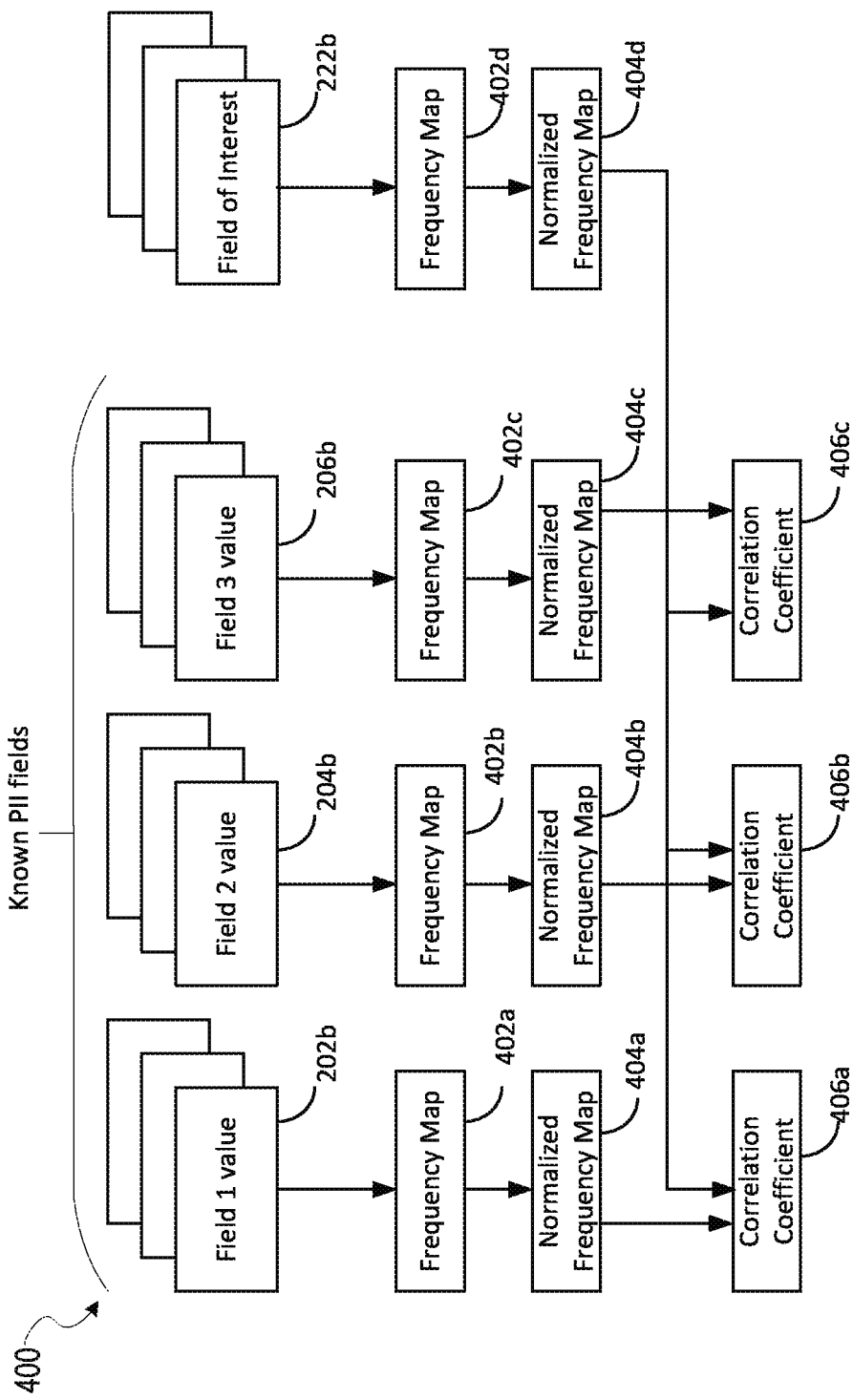
FIG. 4 is a data flow that is implemented in at least some of the disclosed embodiments.

FIG. 4 is a data flow that is implemented in at least some of the disclosed embodiments. FIG. 4 shows samples of three fields 202b, 204b, and 206b. Note the samples of the three fields represent multiple "copies" or instances of the three fields. For example, the multiple instances may be implemented as multiple rows of a relational database, with a single column of the multiple rows represents the field. Alternatively, the multiple instances could be represented by multiple nodes in a linked list or queue, each of the multiple nodes storing data of a particular type, such as nodes storing usernames, phone numbers, account numbers, zip codes, or other data of a common type.

In the example of FIG. 4, the fields 202b, 204b, and 206b are known to contain PII data. FIG. 4 also shows samples of a field of interest 222b. Some embodiments disclosed herein may determine whether field samples 222b includes PII based on whether a frequency profile for bigrams of data within the field samples 222b has a correlation with one of the known PII fields 202b, 204b, or 200 that meet one or more criterion. For example, if a correlation with a particular field of the fields 202b, 204b, or 206b is the highest of any fields, and above a threshold value, the disclosed embodiments may determine that the field of interest 222b includes data of the same type as the particular field. Thus, if the particular field includes PII data, then the disclosed embodiments conclude the field of interest 222b also includes PII data.

To achieve this, a frequency map for each of the field samples 202b, 204b, 206b, and 222b are created. These are shown as 402a-d respectively. The frequency maps may then be normalized, and are shown as 404a-d respectively. Correlation coefficients may then be created between each of the normalized frequency maps for the known PII data. 404a-c, and the normalized frequency map 404d for the unknown data. The disclosed embodiments may then compare the correlation coefficients 404a-c, to see which of the known PII data 202b, 204b, or 206b, has the highest correlation with the unknown data or field of interest 222b. If the highest correlation coefficient meets a criterion (e.g. above a threshold), then the disclosed embodiments may determine that the sampled field of interest 222b includes the same type of data as the known PII data field from which the correlation was determined.

Figure 5:
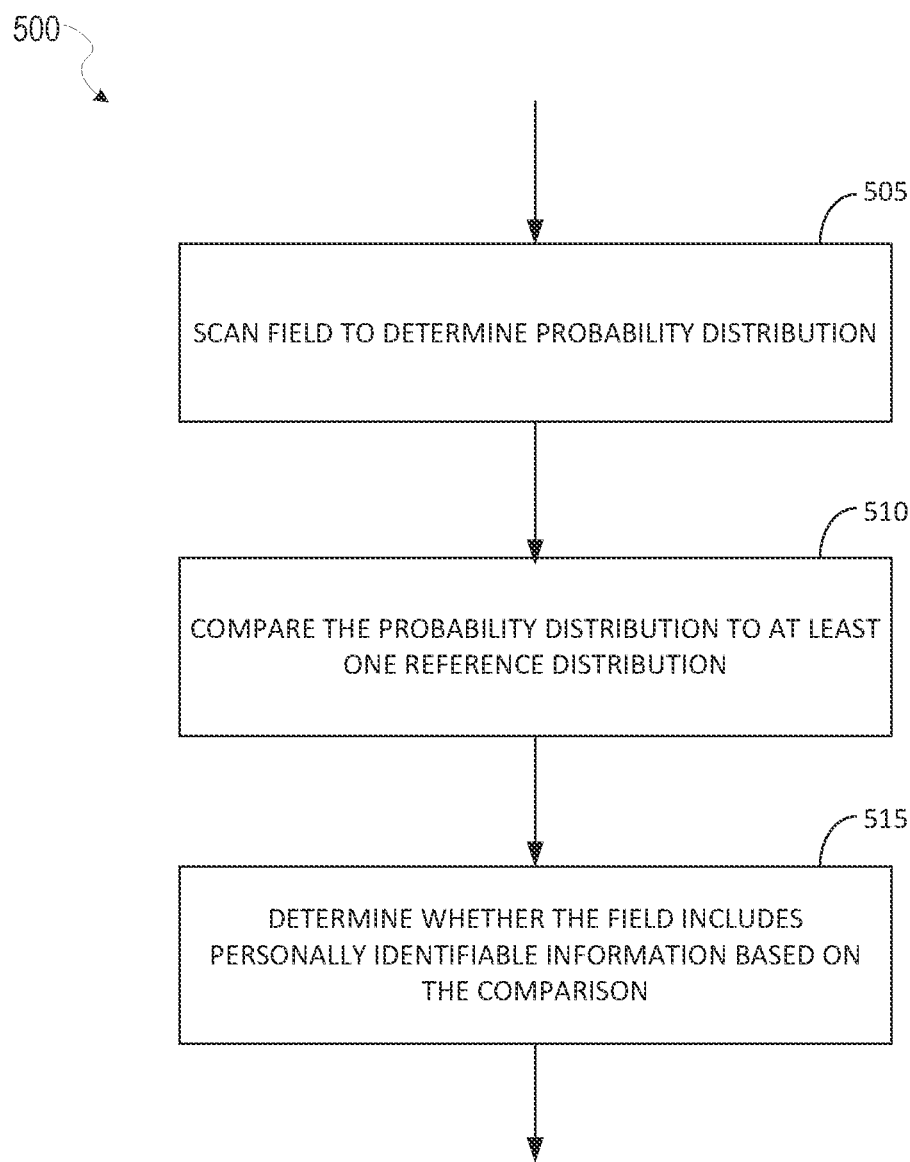
FIG. 5 is a flowchart of a method for determining whether a field contains personally identifiable information.

FIG. 5 is a flowchart of a method for determining whether a field contains personally identifiable information. In some aspects, one or more of the functions discussed below may be performed by an electronic hardware processor. For example, in some aspects, instructions 804 may configure the processing unit 854, discussed below with respect to FIG. 8, to perform one or more of the functions discussed below with respect to FIG. 5. In some aspects, instructions 910 may configure the one or more processors 904 to perform one or more of the functions discussed below with respect to FIG. 5.

In block 505, a field is scanned to determine a probability distribution of the contents of the field. In some aspects, a plurality of values from the field may be scanned to determine the probability distribution. For example, in a relational database implementation, a field may be a column in the database. In these embodiments, values in a plurality of rows (but a single column) are scanned to determine the probability distribution in these aspects. In some aspects, the field may include text data. In these aspects, the probability distribution may be a probability distribution of bigrams. As discussed above with respect to FIG. 3, in some aspects, string based fields may utilize bigrams to determine the probability distribution. Occurrences of each bigram within the plurality of values are counted to generate a frequency map.

Numerical fields may use a different approach for probability distributions. For example, in some aspects, ranges of numbers occurring in the numerical field may be used to determine the probability distribution.

In other aspects, the field may include numerical data. In these aspects, a cumulative distribution function may be determined for the numerical data. For example, if the numerical data represents geographic coordinates, such as latitude and/or longitude information, the cumulative distribution function may determine how many latitude points in the field are less than −89, 88, . . . 89, 90, For example, the cumulative distribution function may determine that 40% of the field values are less than −38.

In some aspects, the probability distribution generated in block 505 may be normalized. The normalization allows the probability distribution to be compared with other reference distributions, despite differences in the number of samples included in each distribution.

In block 510, the probability distribution determined in block 505 is compared to one or more reference probability distributions. For example, prior to the performance of process 500, one or more reference probability distributions may be generated for fields storing known PII data (e.g. 202b, 204b, 206b). For example, a field storing usernames may be analyzed and a reference username probability distribution generated (e.g. frequency map). This reference username probability distribution may then be compared to the probability distribution determined in block 505. One or more similarity metrics may be generated based on the comparison. For example, a Pearson correlation coefficient may be generated based on each of the reference distributions (e.g. 404a-c) and the probability distribution generated in operation 505 (e.g. 404d).

For numeric fields, the comparison between the one or more reference probability distributions and the probability distribution of block 505 may utilize a Kolmogorov Smirnov test.

Block 515 determines whether the field includes PII based on the comparison. For example, if a correlation between the reference probability distribution and the probability distribution generated in block 505 is above a threshold, block 515 may determine the field includes data of the same type as that of the reference field used to generate the reference probability distribution. For text based fields, a Fisher transformation may be used to perform hypothesis testing and to determine confidence intervals.

As discussed above, data determined to include PII may be placed under different levels of access control than data that is not PII. For example, in some aspects, administrative privileges may be necessary to access PII data, whereas user level access may be necessary to access non-PII data. In some aspects, a location of a storage of PII data may be restricted to certain geographic locations. For example, if data is classified as PII data, it may be stored on a first physical storage device (located in a particular jurisdiction compatible with the classification). If the data is not PII data, it may be stored on a second physical storage device, which may be located in a different geographic location than the first physical storage device. As one example, the second storage device location may be optimized around cost or performance or a combination of these. A location of the first storage device may be required to be within a geographic boundary, so as to comply with particular legal requirements. Thus, the cost and/or performance of the first storage device may be inferior to that of the second storage device. Thus, classifying data as PII data may cause access to the data to be slower and/or more costly than data classified as non-PII data.

Figure 6:
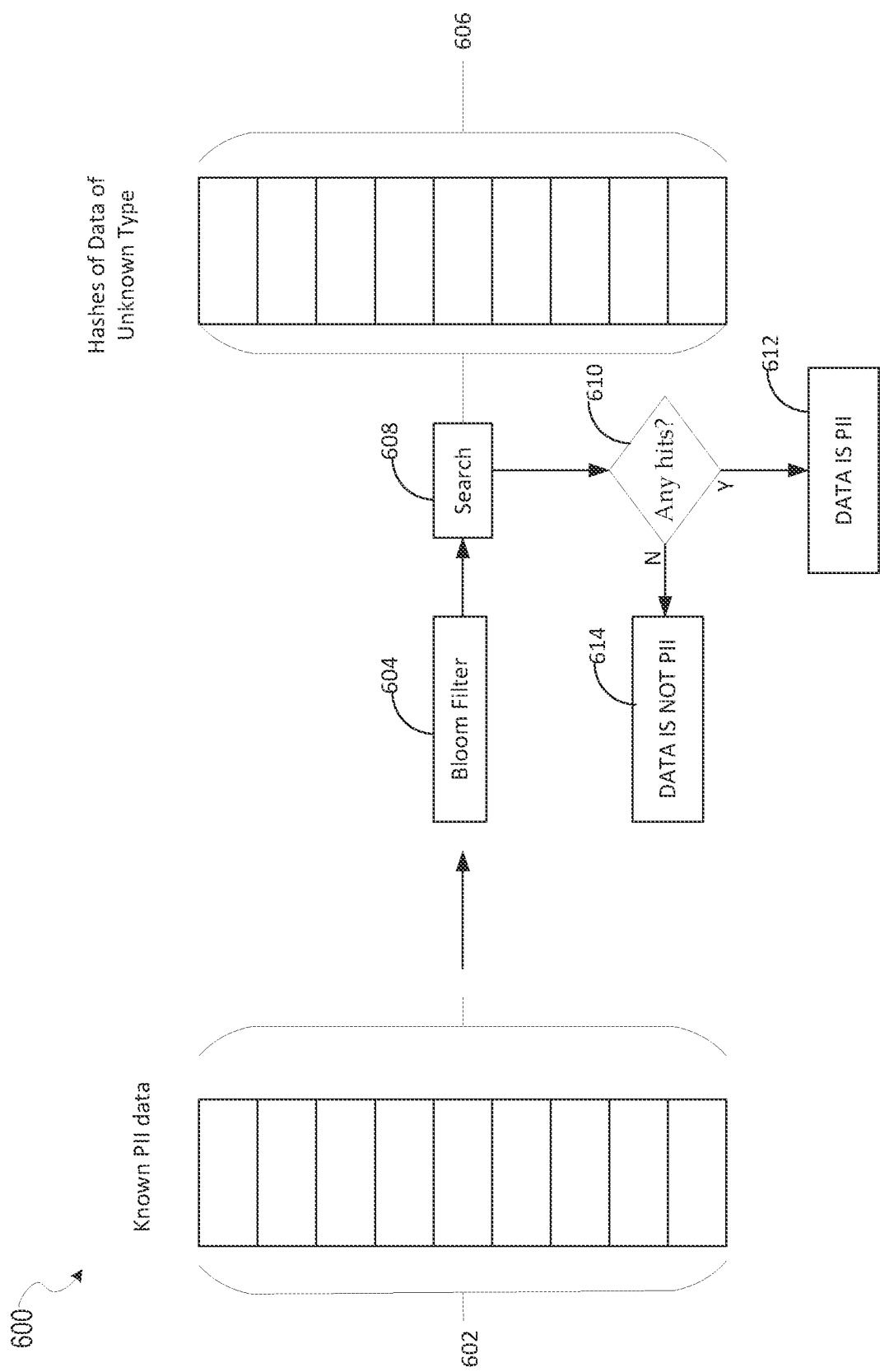
FIG. 6 is a data flow diagram implemented in at least some of the disclosed embodiments.

FIG. 6 is a data flow diagram implemented in at least some of the disclosed embodiments. Some of the disclosed embodiments may classify hashed data fields as including PII or not including PII. Classifying hashed data fields is more challenging, than text based fields. For example, a non-uniform nature of text fields make them good candidates for the frequency counting discussed above. Hashing tends to make the usernames more uniform, making the identification more challenging.

FIG. 6 shows that a field values including PII 602 may be placed in a bloom filter 604. A search operation 608 then searches the bloom filter 604 for hash values for a field of interest 606

In some aspects, a direct set intersection approach may be used for detecting hashes. In these aspects, a subset of hashes may be stored in a Bloom filter and then a field of interest can be evaluated to determine whether it contains any of the elements of the Bloom filter. The Bloom filter may need to accommodate a large number of unique field values for the hashes of fields known to include PII data (e.g., username). In some aspects, the known PII field may be subsampled to reduce the processing burden associated with including all of the field values in a bloom filter.

Selecting an appropriate bloom filter size, sample set size, and sample of the field of interest may tune the solution to provide a desired accuracy level. The probability that at least one item is common between a Bloom filter and a set of interest is approximately:

$$Pr(\text{non-empty intersection}) = 1 - \exp(-p1 * p2 * N), \quad (1)$$

where:
p1 is a proportion sampled for Bloom Filter,
p2 is the proportion of the field of interest that is sampled, and
N is the number of unique elements (the size of the Bloom filter for example)

An evaluation based on equation 1 above indicates that, for example, if 200,000 samples are included in a Bloom filter, and 20,000 samples are included from a field of interest, a probability that at least one element is in common is above an acceptable threshold. This results in a bloom filter that is 0.5 Megabytes in size. Other aspects may maintain 200,000 hashes and perform direct comparisons.

Figure 7:
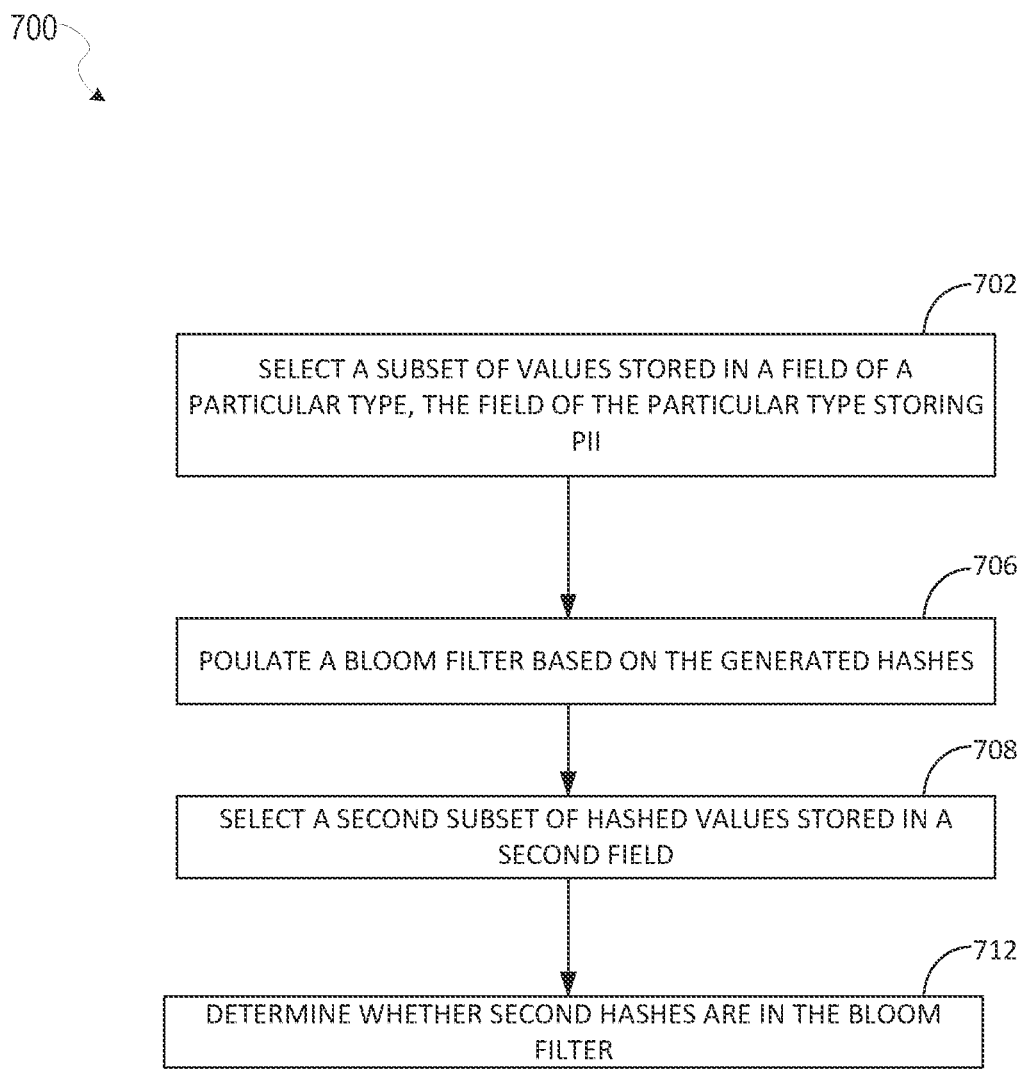
FIG. 7 is a flowchart of determining whether hashed data includes PII.

FIG. 7 is a flowchart of determining whether hashed data includes PII. In some aspects, one or more of the functions discussed below with respect to FIG. 7 may be performed by an electronic hardware processor. For example, in some aspects, instructions 804 may configure the processing unit 854, discussed below with respect to FIG. 8, to perform one or more of the functions discussed below with respect to FIG. 7. In some aspects, instructions 910 may configure the one or more processors 904 to perform one or more of the functions discussed below with respect to FIG. 7.

In operation 702, a subset of values stored in a field of a particular type are selected. For example, as discussed above, a user name field including a large number of values (X), could be subsampled to select a portion of those values (X/Y values for example). As discussed above with respect to FIG. 6, the subset of values stored in the field in operation 702 may be subsampled according to proportion p1, discussed above with respect to equation 1.

In operation 706, a bloom filter is populated based on the selected values. In some aspects, operation 706 may include invoking a number of different hash functions on each value in the subset of values to populate the bloom filter.

In operation 708, a second subset of values is selected from a field of interest. For example, as discussed above with respect to FIG. 6, field of interest values 606 may be down sampled. In some aspects, the down sampling of operation 708 may be based on p2 of equation 1, discussed above.

In operation 712, a determination is made as to whether any of the hashed values in the field of interest are represented by the bloom filter (e.g. 604). In some embodiments, if any of the hashed values of the field of interest (e.g. 606) are represented by the bloom filter, the field of interest is determined to include PII. Otherwise, the field of interest may be determined to not include PII. If the field is determined to include PII, some embodiments may treat the data differently. For example, a level of authentication necessary to access the field may be different than if the field is determined to not include PII. For example, some embodiments require administrative privileges to access data categorized as PII, whereas non-PII data may be accessed with user level privileges.

Software Architecture

Figure 8:
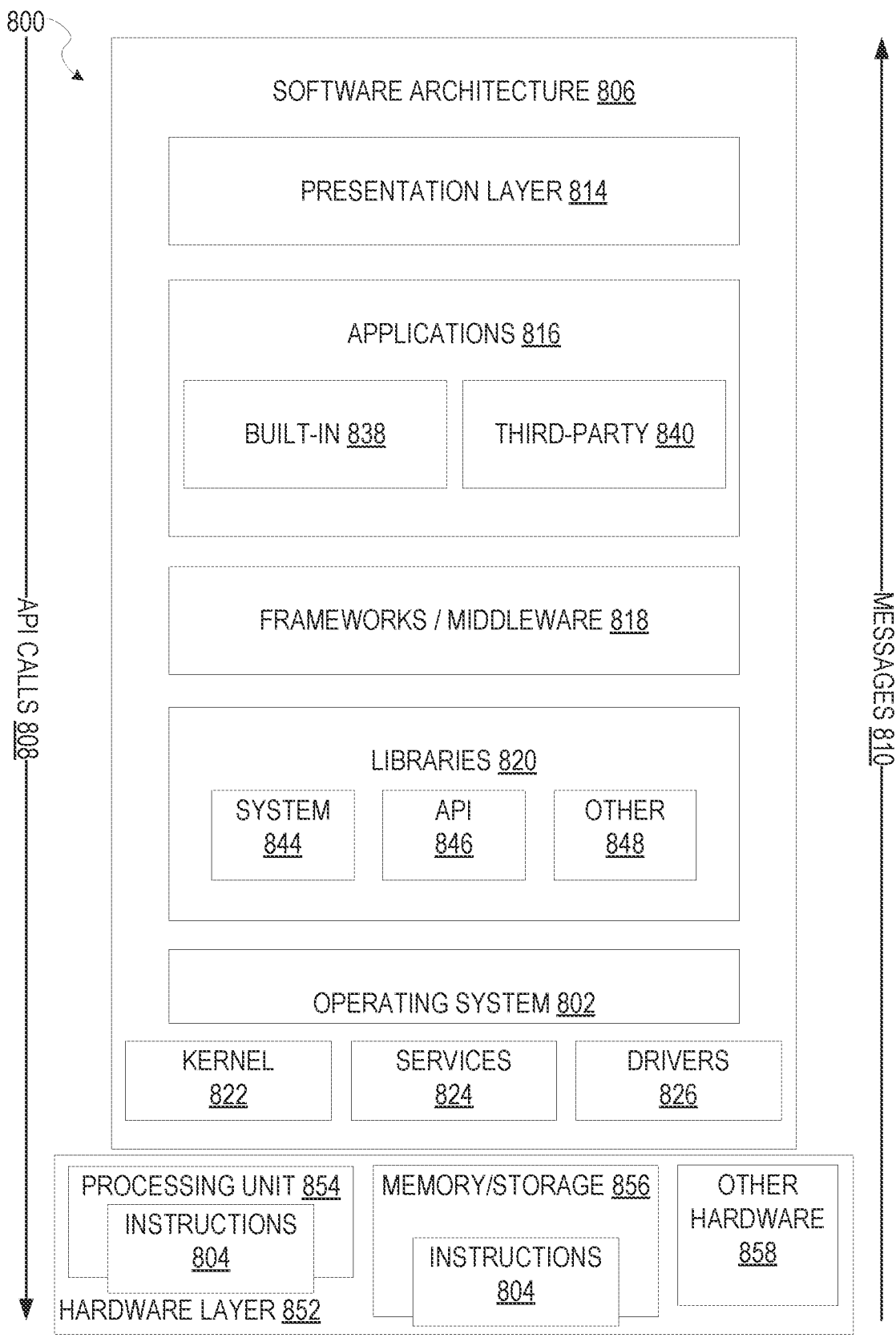
FIG. 8 is a flowchart of a method of identifying personally identifiable information (PII).

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as a machine 900 of FIG. 9 that includes, among other things, processors 804, memory/storage 806, and I/O components 818. A representative hardware layer 852 is illustrated and can represent, for example, the machine 900 of FIG. 9. The representative hardware layer 852 includes a processing unit 854 having associated executable instructions 804. The executable instructions 804 represent the executable instructions of the software architecture 806, including implementation of the methods, components, and so forth described herein. The hardware layer 852 also includes memory and/or storage 856, which also have the executable instructions 804. The hardware layer 852 may also comprise other hardware 858.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (MC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

Figure 9:
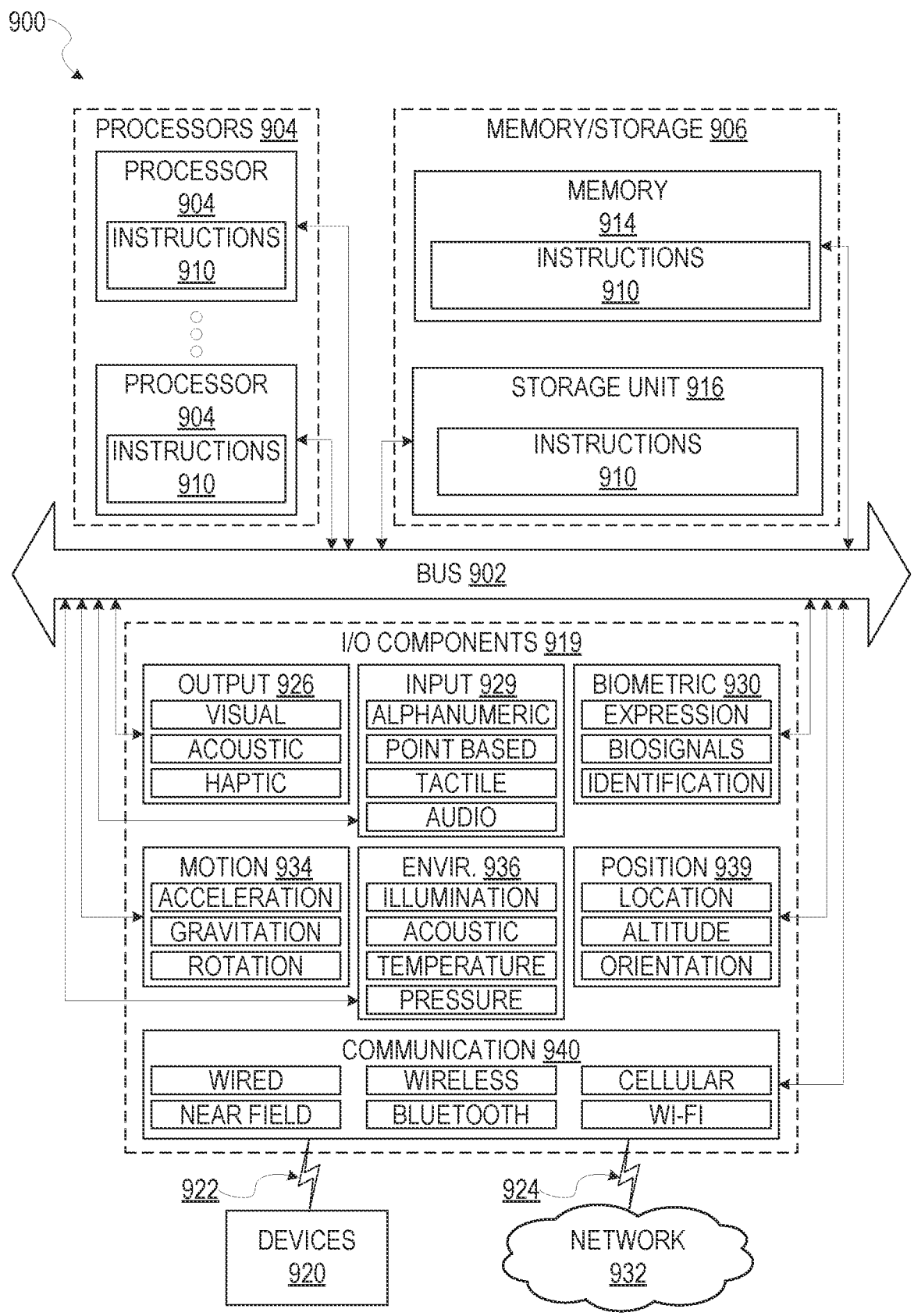
FIG. 9 is a block diagram of a hardware architecture that may be utilized by one or more of the disclosed embodiments.

In the exemplary architecture of FIG. 9, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response as messages 810. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than by interfacing directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media formats such as MPEG4, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. The third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as the operating system 802) to facilitate functionality described herein.

The applications 816 may use built-in operating system functions (e.g., kernel 822, services 824, and/or drivers 826), libraries 820, and frameworks/middleware 818 to create user interfaces to interact with users of the system. Alternatively, or additionally, in some systems interactions with a user may occur through a presentation layer, such as the presentation layer 814. In these systems, the application/component "logic" can be separated from the aspects of the application/component that interact with a user.

Exemplary Machine

FIG. 9 is a block diagram illustrating exemplary components (also referred to herein as "modules") of a machine 900. In some aspects, the machine is configured to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an apples, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of the processors 904 are examples of machine-readable media. In some aspect, the processors 202 and processors 904 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 918 may include a wide variety of components to provide a user interface for receiving input, providing output, producing output, transmitting information, exchanging information, capturing measurements, and so on. The specific I/O components 918 that are included in the user interface of a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various exemplary embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 928 may also include one or more image-capturing devices, such as a digital camera for generating digital images and/or video.

In further exemplary embodiments, the I/O components 918 may include biometric components 930, motion components 934, environment components 936, or position components 938, as well as a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a CRS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via a coupling 924 and a coupling 922 respectively. For example, the communication components 940 may include a network interface component or other suitable device to interface with the network 932. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
   determining that a first storage field stores numerical data;
   determining a cumulative distribution function for the numerical data stored in the first storage field, the cumulative distribution function determining how many points in the numerical data are less than a specified range of values;
   determining, based on the cumulative distribution function, that the first storage field stores personally identifiable information (PII) data associated with a user and that a second storage field stores non-PII data;
   determining a storage location of the first storage field based on determining that the first storage field stores the PII data;
   determining a geographic location associated with the user;
   causing the PII data stored in the first storage field to be stored in a subset of available storage devices that are physically located at a location corresponding to the geographic location associated with the user, wherein the non-PII data in the second storage field is stored in at least one storage device that is located in a different geographic location than the subset of available storage devices; and
   providing a first access control to the first storage field and a second access control to the second storage field, the second access control being different than the first access control.

2. The method of claim 1, further comprising:
   generating first frequency maps for a plurality of storage fields, each of the first frequency maps based on counts of unique substrings occurring in instances of a respective one of the plurality of storage fields;
   generating a second frequency map for the first storage field;
   determining correlations between each of the first frequency maps and the second frequency map.

3. The method of claim 2, further comprising:
   determining, based on the correlations, that a third storage field stores certain PII data of an equivalent type as each of the plurality of storage fields and that a fourth storage field stores certain non-PII data; and
   providing, based on determining that the third storage field stores the certain PII data and that the fourth storage field stores the certain non-PII data, the first and second access controls.

4. The method of claim 2, wherein generating each of the first frequency maps comprises:

generating the unique substrings as bigrams included in a respective storage field of the plurality of storage fields;
counting occurrences of the bigrams to generate the counts of the unique substrings;
for at least one of the plurality of storage fields, generating a set of bigrams present in the at least one of the plurality of storage fields; and
determining a probability distribution based on the set of bigrams.

5. The method of claim 2, further comprising:
generating the second frequency map for the first storage field based on the cumulative distribution function.

6. The method of claim 2, further comprising normalizing the first frequency maps and the second frequency map.

7. The method of claim 2, further comprising:
determining, based on the correlations, that a third storage field stores PII data of an equivalent type as each of the plurality of storage fields and that a fourth storage field stores non-PII data by performing a Kolmogorov Smirnov test comparing the first frequency maps to the second frequency map.

8. The method of claim 1, further comprising determining that the first storage field includes the PII data based on correlations between a plurality of frequency maps, wherein the first storage field stores textual information, and wherein the correlations are determined using a Fisher transformation.

9. The method of claim 1, further comprising deleting contents of the first storage field in response to determining the first storage field includes the PII data.

10. The method of claim 1, wherein providing the first and second access controls comprises generating access controls that require administrative privileges for accessing the first storage field and that require user level privileges for accessing the second storage field.

11. The method of claim 1, further comprising:
marking particular storage devices as being located in particular geographic locations.

12. The method of claim 1, further comprising:
determining that a given storage field of a plurality of storage fields stores data that includes PII;
selecting a first subset of values stored in the given storage field; and
populating a Bloom filter based on the selected first subset of values by invoking a plurality of different hash functions on each value in the selected first subset of values stored in the given storage field.

13. The method of claim 12, further comprising:
selecting a second subset of values stored in the first storage field based on the Bloom filter;
determining that at least one of the second subset of values stored in the first storage field are represented by the Bloom filter; and
in response to the determining that the at least one of the second subset of values stored in the first storage field are represented by the Bloom filter, determining that the first storage field includes the PII data of the given storage field.

14. The method of claim 1, further comprising:
determining a physical address associated with the user; and
selecting the subset of the available storage devices that are physically located at the location appropriate for the physical address associated with the user.

15. A system comprising:
hardware processing circuitry; and
a hardware memory comprising instructions that when executed configure the hardware processing circuitry to perform operations comprising:
determining that a first storage field stores numerical data;
determining a cumulative distribution function for the numerical data stored in the first storage field, the cumulative distribution function determining how many points in the numerical data are less than a specified range of values;
determining, based on the cumulative distribution function, that the first storage field stores personally identifiable information (PII) data associated with a user and that a second storage field stores non-PII data;
determining a storage location of the first storage field based on determining that the first storage field stores the PII data;
determining a geographic location associated with the user;
causing the PII data stored in the first storage field to be stored in a subset of available storage devices that are physically located at a location corresponding to the geographic location associated with the user, wherein the non-PII data in the second storage field is stored in at least one storage device that is located in a different geographic location than the subset of available storage devices; and
providing a first access control to the first storage field and a second access control to the second storage field, the second access control being different than the first access control.

16. The system of claim 15, wherein the operations further comprise:
generating first frequency maps for a plurality of storage fields, each of the first frequency maps based on counts of unique substrings occurring in instances of a respective one of the plurality of storage fields.

17. The system of claim 16, wherein the operations further comprise:
generating a second frequency map for a third storage field and a fourth storage field;
determining that the third storage field stores numerical data; and
determining the cumulative distribution function for the numerical data stored in the third storage field, the cumulative distribution function determines how many points in the numerical data stored in the third storage field are less than the specified range of values;
determining correlations between each of the first frequency maps and the second frequency map;
determining, based on the correlations, that the third storage field stores certain PII data of an equivalent type as each of the plurality of storage fields and that the fourth storage field stores certain non-PII data; and
providing, based on determining that the third storage field stores the certain PII data and that the fourth storage field stores the certain non-PII data, the first and second access controls.

18. The system of claim 16, wherein generating each of the first frequency maps comprises:
generating the unique substrings as bigrams included in a respective storage field of the plurality of storage fields;
counting occurrences of the bigrams to generate the counts of the unique substrings;
for at least one of the plurality of storage fields, generating a set of bigrams present in the at least one of the plurality of storage fields; and determining a probability distribution based on the set of bigrams.

19. The system of claim 16, wherein the operations further comprise:
generating a second frequency map for a third storage field and a fourth storage field.

20. A non-transitory computer readable storage medium comprising instructions that when executed configure hardware processing circuitry to perform operations comprising:
determining that a first storage field stores numerical data;
determining a cumulative distribution function for the numerical data stored in the first storage field, the cumulative distribution function determining how many points in the numerical data are less than a specified range of values;
determining, based on the cumulative distribution function, that the first storage field stores personally identifiable information (PII) data associated with a user and that a second storage field stores non-PII data;
determining a storage location of the first storage field based on determining that the first storage field stores the PII data,
determining a geographic location associated with the user;
causing the PII data stored in the first storage field to be stored in a subset of available storage devices that are physically located at a location corresponding to the geographic location associated with the user, wherein the non-PII data in the second storage field is stored in at least one storage device that is located in a different geographic location than the subset of available storage devices; and
providing a first access control to the first storage field and a second access control to the second storage field, the second access control being different than the first access control.

* * * * *

UNITED STATES PATENT AND TRADEMARK OFFICE
CERTIFICATE OF CORRECTION

PATENT NO. : 11,797,709 B2
APPLICATION NO. : 17/583866
DATED : October 24, 2023
INVENTOR(S) : Pihur et al.

Page 1 of 1

It is certified that error appears in the above-identified patent and that said Letters Patent is hereby corrected as shown below:

In the Claims

In Column 20, Line 3, in Claim 20, delete "data," and insert --data;-- therefor

Signed and Sealed this
Fourth Day of February, 2025

Coke Morgan Stewart
*Acting Director of the United States Patent and Trademark Office*